Oct. 22, 1968  A. C. SCHOUW  3,406,825

CENTRIPETAL SEPARATION METHOD AND APPARATUS

Filed Nov. 21, 1966

INVENTOR.

Arthur C. Schouw

BY

WILSON, SETTLE, BATCHELDER
ATT'YS.  & CRAIG.

United States Patent Office 3,406,825
Patented Oct. 22, 1968

3,406,825
CENTRIPETAL SEPARATION METHOD
AND APPARATUS
Arthur C. Schouw, Corunna, Mich., assignor to Hydromation Engineering Co., Livonia, Mich.
Filed Nov. 21, 1966, Ser. No. 595,893
2 Claims. (Cl. 210—65)

ABSTRACT OF THE DISCLOSURE

The invention is a method and apparatus in which particles are separated from a liquid by the steps of swirling a body of the liquid about an axis at a velocity in which particles in the liquid collect centrally of the body within a perforated tube located centrally of and co-axial with the body, removing particles and some liquid from the body by applying suction to the tube to suck particles and liquid axially out from the tube, and removing clarified liquid from the periphery of the liquid body. The apparatus includes a circular chamber closed at one end thereof and open at the opposite end thereof and having a cylindrical side wall extending between the ends, an inlet leading into the chamber through the side wall near the closed end of the chamber for introducing the liquid generally tangentially into the chamber to impart the swirling motion to the liquid, and an overflow outlet at the open end of the chamber for withdrawal of clarified liquid from the chamber by overflow of the side wall. The perforated tube is located within the side wall of the chamber and co-axial therewith for withdrawal of particles and liquid axially therefrom by applying suction to the tube. A lock device may be provided in communication with the bottom of the chamber for removing settled particles form the chamber.

---

This invention relates to a method of and apparatus for separating particles from a liquid in which the particles are distributed, and more particularly to a method of centripetal separation and a centripetal separator apparatus.

When separating particles from a liquid in a centrifuge, a liquid body is whirled around an axis at a velocity which causes particles to move radially outwardly to the periphery of the whirling liquid where the particles may be drawn off. The particles go to the outside because of centrifugal force acting on them.

It has been found in accordance with the invention that by whirling the liquid around an axis at a slower velocity, particles may be made to go to the center of the whirling body where the vortex is located. The particles go to the vortex because predominantly centripetal force acts on them. Particles and some liquid may be withdrawn axially from the center of the whirling liquid body, and clarified liquid may be withdrawn peripherally.

In carrying out such centripetal separation, a stream of liquid is introduced tangentially into a circular chamber to induce the liquid to whirl about a central axis of the chamber and form a vortex at that axis. The velocity of the incoming stream is controlled below a maximum, centrifuging value to cause particles in the liquid to collect centrally of the chamber under the influence of centripetal force. The more dense particles or those particles of high weight-to-surface area ratio will sink to the bottom of the chamber, but assuming there is a wide distribution of particle density or particle size in the liquid, some lighter particles or particles of low weight-to-surface area ratio will collect at the center of the whirling liquid, neither sinking to the bottom nor rising to the top of the liquid. In order to withdraw these particles from the liquid as well as the particles which settle to the bottom, a perforate tube is provided at the center of the chamber and coaxial therewith, and suction is applied to this tube to remove the collected particles and some liquid from the vortex of the whirling liquid. The liquid stream is introduced into the chamber at the bottom thereof, and clarified liquid is withdrawn from an overflow outlet provided at the top of the side wall of the chamber.

An apparatus embodiment of the invention includes a circular chamber having an essentially cylindrical side wall which is closed at the bottom end thereof and open at the top end thereof. A tangential inlet leads into the chamber through the side wall thereof and adjacent to the closed bottom end. The perforate outlet tube referred to previously is located centrally of the side wall to be coaxial therewith, and suction is applied to the tube for withdrawing particles and liquid from the vortex of the swirling liquid body when the apparatus is operating. The perforate tube is open at its bottom end, and the total area of the holes in its tube wall is less than the area of the open bottom end to assure a constant flow from bottom to top of the tube. An overflow type of outlet is provided at the top edge of the circular side wall of the chamber for withdrawing clarified liquid from the chamber by causing the liquid to overflow the top edge of the side wall.

It is an object of this invention to provide a method and apparatus for separating particles from a liquid by centripetal action.

Another object of the invention is to provide a method and apparatus for separating particles from a liquid containing the particles wherein the particles collect at the center of a whirling body of liquid and are withdrawn from there by suction.

A further object of the invention is to provide a centripetal separator wherein liquid containing particles is introduced at the bottom of the separator, whirls around an axis within the separator, and a clarified portion of the liquid is withdrawn at the top of the separator.

Another object of the invention is to provide a centripetal separator with an outlet for withdrawing particles and liquid from the center of a whirling body of liquid on a continuous basis.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
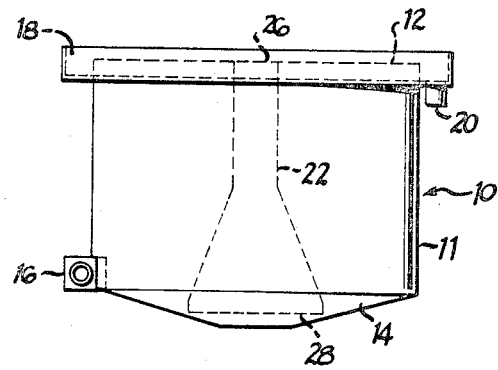
FIGURE 1 is an elevational view of a centripetal separator in accordance with one embodiment of the invention.
Figure 3:
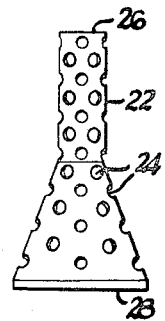
FIGURE 3 is an elevational view of a perforate tube provided at the center of the separator of FIGURE 1.
Figure 2:
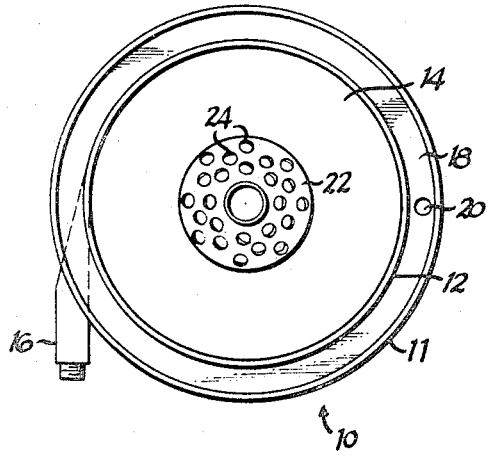
FIGURE 2 is a top plan view of the separator of FIGURE 1.

As shown on the drawings:

The centripetal separator or FIGURES 1 through 3 includes a tank 10 which is open at its top end 12 and is closed at its bottom end by a sloping bottom wall 14. The tank 10 has a hollow interior into which liquid containing particles is introduced through an inlet 16 which is located substantially at the bottom of the side wall 11 of the tank 10 and which leads through the side wall of the tank into the interior of the tank. It may be seen in FIGURE 2 that the inlet 16 is tangential to the circular periphery of the tank 10, and the inlet is made tangential so that it will direct a stream of liquid into the tank tangentially and will cause the stream to whirl about the axis of the tank and form a vortex at the center of the tank. The liquid follows an upwardly spiralling path through the tank and leaves the tank by overflowing the top edge 12 of the tank. A trough 18 is provided around the upper edge 12 of the tank, and there is an outlet 20 communicating with the trough through which clarified liquid leaves the tank.

The velocity of the incoming stream of liquid entering the tank through inlet 16 is controlled as by means of a pump or the like so that particles contained in the liquid migrate to the axis at the center of the tank 10 due to centripetal force acting on the particles. The more dense particles, or those particles of high weight-to-surface area ratio, settle to the bottom of the tank at its center, but some less dense particles, or particles of low weight-to-surface area ratio, will remain suspended in the liquid at the center of the tank because the pressure above and below them will be equal. The latter particles will neither sink nor rise, but will stay at the vortex circulating around the center of the tank at some height above the bottom of the tank until they are drawn off.

The particles are drawn off through a vortex collector tube 22 which is located at the center of the tank and extends from its bottom wall 14 to its top end 12. The tube 22 is concentric and coaxial with side wall 11 of the tank 10 and is spaced inwardly from the wall of the tank 10 to be located right at the vortex of the whirling body of liquid provided in the tank 10. The tube 22 has a plurality of holes 24 extending through its tube wall, and these holes provide access for liquid to enter into the interior of the tube. The tube is open at its bottom and top ends, and suction is applied to the top end of the tube as by means of a pump connected to the tube by a line so as to suck liquid and particles out of the tank. The area of the open bottom end of the tube is made larger than the total area of the holes through the tube so that there will be a constant flow of liquid into the tube from the sides and bottom.

In operation, liquid containing particles is pumped through the inlet 16 in a tangential direction relative to the circumference of the tank 10 so that the liquid stream entering the tank whirls about the axis of the tank and causes liquid in the tank to also whirl about the axis and form a vortex at the center of the tank. The velocity of the stream is made slow enough to cause the particles in the liquid to migrate toward the vortex at the center of the tank, and particles collect at the vorex and on the bottom of the tank underneath the vortex collector tube 22. Particles and liquid enter into the center of the vortex collector tube through the openings 24. The liquid spirals upwardly through the tank as previously mentioned, and clarified liquid overflows the top edge 12 of the tank into the trough 18 and flows out through the outlet pipe 20. Particles and some additional liquid are sucked out through the vortex collector tube 22 due to the suction applied to the tube by means of another pump (not shown).

In this way the liquid is clarified in the tank, and clarified liquid flows out through the outlet pipe 20. It has been found that a relatively wide range of particle sizes can be removed from the liquid in the centripetal separator which has been described. Specifically, a wider range of particle sizes may be separated than could be separated by centrifuging the same liquid.

Figure 4:
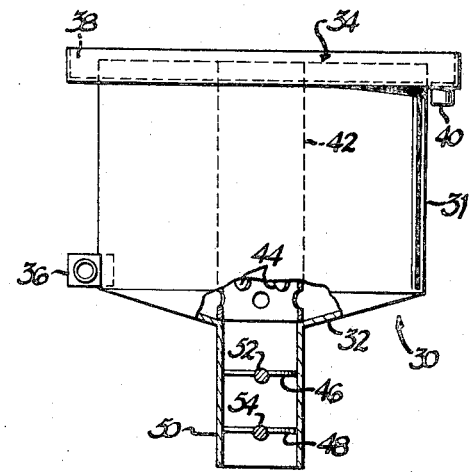
FIGURE 4 is an elevational view, partly in section, of another embodiment in which an air lock is provided at the bottom of the separator.

Another embodiment of the invention is shown in FIGURE 4. This embodiment is similar to the embodiment of FIGURES 1 to 3 and includes a tank 30 which, like the tank 10, has a closed bottom wall 32 and is open at the top end 34. The interior of the tank is hollow. An inlet 36 is located near the bottom of the tank and leads through the side wall of the tank tangentially to the circular side wall of the tank. A trough 38 is provided at the top end 34 of the tank so that liquid can overflow the top edge of the tank's side wall 31 and collect in the trough 38. An outlet pipe 40 communicates with the trough and liquid leaves the tank through the outlet 40.

A vortex collector tube 42 is again located at the center of the tank and extends from the bottom wall 32 to the top edge 34 of the tank. In this embodiment the tube 42 has a straight side wall rather than a flared wall as in the case of the tube 22 of FIGURES 1–3. The tube 42 has openings 44 extending through its tube wall and these openings allow liquid and particles to flow into the tube so that the particles will collect centrally of the tank.

In the embodiment of FIGURE 4, an air lock arrangement is provided at the bottom of the tank 30 and located centrally thereof for allowing heavy particles which settle at the bottom of the tank to be dumped out of the tank. The air lock arrangement is comprised of two spaced butterfly valves 46 and 48 provided in a bottom outlet tube 50. Valve 46 is rotatable on a shaft 52, and valve 48 is rotatable on a shaft 54. Both valves are closed while liquid is being passed through the tank 30, and heavy particles which settle to the bottom of the tank collect on the upper side of valve 46. The flow of liquid into the tank may be interrupted long enough to allow dumping the latter particles out through tube 50. To accomplish this, valve 46 is opened while valve 48 remains closed so as to dump the particles from valve 48 into the vestibule between valves 46 and 48. Valve 46 is then closed and valve 48 is opened to discharge the particles from the tank into a suitable collecting receptacle (not shown).

The centripetal separator of FIGURE 4 operates like the separator of FIGURES 1 to 3 except for the provisions in FIGURE 4 for dumping particles out the bottom of a tank 30. Liquid containing particles enters the tank tangentially through the inlet 36 and swirls about the axis of the tank 30 forming a vortex at the center of the tank. The velocity of the liquid is controlled so that particles migrate to the center of the tank into the collector tube 42, and the lighter particles are sucked out of the tank through the top end of the collector tube 42. Liquid spirals upwardly through the tank and overflows the top edge 34 of the tank into the trough 38 from which it leaves via the outlet 40.

The invention thus provides a method of separating particles from liquid by centripetal action, and a centripetal separator for carrying out the method. A wide range of particle sizes may be removed from a liquid such that the method and apparatus of the invention clarifies the liquid in a simple and straightforward manner. Any fines which remain in the liquid may be subsequently separated by filtration, and the separator of the invention may be used as a means of preliminarily treating a liquid prior to filtration.

Having thus described my invention, I claim:

1. A method of separating particles from a liquid in which the particles are distributed, said method comprising the steps of introducing a stream of said liquid into a circular chamber at the bottom thereof, directing said stream tangentially relative to the circular periphery of said chamber thereby causing the liquid in said chamber to whirl about a central axis thereof and to form a vortex at said axis which flows into a perforate tube concentric with said axis, one end of said perforate tube being at the bottom of said chamber and the other end of said perforate tube being above the upper edge of said chamber, controlling the velocity of said stream to cause particles in said liquid to collect centrally of said chamber within said perforate tube, removing said particles with some liquid from said tube by applying suction to said other end of said perforate tube to thereby withdraw particles and liquid axially of said tube, and overflowing clarified liquid over an upper peripheral edge of said chamber.

2. Apparatus for separating particles from a liquid in which the particles are distributed, said apparatus comprising a circular chamber closed at one end thereof and open at the opposite end thereof and having a circular peripheral wall extending between said ends thereof, an inlet leading into said chamber through said peripheral wall adjacent said closed end of said chamber, said inlet extending generally tangentialy relative to said peripheral wall for introducing a stream of liquid into said chamber tangentialy so that said liquid whirls about said chamber and forms a vortex centrally thereof in the operation of said apparatus, a perforate tube concentric and coaxial with said peripheral wall and at least coextensive therewith and spaced inwardly therefrom for the withdrawal of particles from said vortex, means for applying suction to said tube to remove particles which collect there due to centripetal force acting thereon, and an overflow outlet at the edge of said peripheral wall at the open end of said chamber for withdrawal of clarified liquid from said chamber by overflow of said edge.

References Cited

UNITED STATES PATENTS 3,285,422   11/1966   Wiley _____ 210—512

FOREIGN PATENTS 1,037,418   8/1958   Germany.

REUBEN FRIEDMAN, *Primary Examiner.*

J. DeCESARE, *Assistant Examiner.*